United States Patent
Briggs et al.

[11] Patent Number: 5,963,399
[45] Date of Patent: Oct. 5, 1999

[54] DUAL LOOP FLEX CIRCUIT FOR A LINEAR ACTUATOR

[75] Inventors: John C. Briggs, Lexington, Mass.; David E. Jones, Layton; Thomas J. Angellotti, Ogden, both of Utah

[73] Assignee: Iomega Corporation, Roy, Utah

[21] Appl. No.: 08/866,190

[22] Filed: May 30, 1997

[51] Int. Cl.$^6$ .................................................. G11B 5/55
[52] U.S. Cl. ................................................................ 360/106
[58] Field of Search ............................ 360/104–106

[56] References Cited

U.S. PATENT DOCUMENTS

| | | | |
|---|---|---|---|
| 4,439,699 | 3/1984 | Brende et al. | 310/13 |
| 4,504,879 | 3/1985 | Toldi et al. | 360/105 |
| 4,663,677 | 5/1987 | Griffith et al. | 360/71 |
| 4,663,682 | 5/1987 | McNeil | 360/105 |
| 4,683,506 | 7/1987 | Toldi et al. | 360/105 |
| 4,722,012 | 1/1988 | Toldi et al. | 360/97 |
| 4,740,851 | 4/1988 | Jones et al. | 360/97 |
| 4,787,000 | 11/1988 | Schulze | 360/105 |
| 4,811,143 | 3/1989 | Ohashi et al. | 360/105 |
| 4,901,173 | 2/1990 | Jones et al. | 360/99.04 |
| 4,965,685 | 10/1990 | Thompson et al. | 360/97.01 |
| 5,027,241 | 6/1991 | Hatch et al. | 360/105 |
| 5,291,359 | 3/1994 | Wolter | 360/104 |
| 5,508,864 | 4/1996 | Briggs et al. | 360/106 |
| 5,530,607 | 6/1996 | Spendlove | 360/105 |
| 5,701,220 | 12/1997 | Koriyama | 360/106 |
| 5,748,410 | 5/1998 | Briggs et al. | 360/106 |

*Primary Examiner*—Allen T. Cao
*Attorney, Agent, or Firm*—Woodcock Washburn Kurtz Mackiewicz & Norris LLP

[57] ABSTRACT

A dual loop flex circuit for conducting signals between heads of an actuator carriage assembly and an electrical circuit board and for supplying power to a voice coil is provided. The first loop conducts the signals between the heads and the second loop supplies power to the coil. Each loop is mounted in part on a shroud which serves as an anchor for the loops. The other parts of the loops are attached to opposite sides of the actuator carriage assembly such that forces exerted on the actuator carriage assembly by the first loop are canceled by forces exerted on the actuator carriage assembly by the second loop.

6 Claims, 5 Drawing Sheets

DUAL LOOP FLEX CIRCUIT FOR A LINEAR ACTUATOR

The present invention relates to data storage devices, or disk drives, for storing digital information, and more particularly, to a dual loop flex circuit for a voice coil actuator of a disk drive.

BACKGROUND OF THE INVENTION

Disk drives for storing electronic information are found in a wide variety of computer systems, including workstations, personal computers, and laptop and notebook computers. Such disk drives can be stand-alone units that are connected to a computer system by cable, or they can be internal units that occupy a slot, or bay, in the computer system. Laptop and notebook computers have relatively small bays in which to mount internal disk drives and other peripheral devices, as compared to the much larger bays available in most workstation and personal computer housings. The relatively small size of peripheral bays found in laptop and notebook computers, can place significant constraints on the designer of internal disk drives for use in such computers. Techniques that address and overcome the problems associated with these size constraints are therefore important.

Disk drives of the type that accept removable disk cartridges have become increasingly popular. One disk drive product that has been very successful is the ZIP™ drive designed and manufactured by Iomega Corporation, the assignee of the present invention. ZIP™ drives accept removable disk cartridges that contain a flexible magnetic storage medium upon which information can be written and read. The disk-shaped storage medium is mounted on a hub that rotates freely within the cartridge. A spindle motor within the ZIP™ drive engages the cartridge hub when the cartridge is inserted into the drive in order to rotate the storage medium at relatively high speeds. A shutter on the front edge of the cartridge is moved to the side during insertion into the drive, thereby exposing an opening through which the read/write heads of the drive move to access the recording surfaces of the rotating storage medium. The shutter covers the head access opening when the cartridge is outside of the drive, to prevent dust and other contaminants from entering the cartridge and settling on the recording surfaces of the storage medium.

The ZIP™ drive is presently available for workstations and personal computers in both stand-alone and internal configurations. In order to provide a version of the ZIP™ drive for use in laptop and notebook computers, the size constraints of the peripheral bays of such computers must be considered. In particular, for an internal drive to fit in the majority of laptop and notebook peripheral bays, the drive must be no longer than 135 mm. The height of the drive must be in the range of 12 to 15 mm. These dimensions place many constraints on the design of such a drive, and give rise to numerous design problems.

Additional features of an exemplary drive in which the present invention can be employed is demonstrated in commonly assigned applications: Ser. No. 08/866,189, filed on May 30, 1997, entitled "An Improved Operating System For Operating An Eject System And A Head Retraction System Of A Disk Drive"; Ser. No. 08/866,225, filed on May 30, 1997, entitled "An Improved Head Retraction System for Retracting The Heads Of A Disk Drive"; Ser. No. 08/866, 177, filed on May 30, 1997, entitled "Motor Loading System For A Disk Drive"; and Ser. No. 08/866,226, filed on May 30, 1997, entitled "An Improved Eject System For Ejecting A Disk Cartridge From A Disk Drive", all of which are hereby incorporated herein by reference in their entirety.

Disk drives often employ linear actuators for positioning read/write heads of the disk drive over the surfaces of the storage media. Actuator carriage assemblies are used to carry the heads for magnetic disk drives, CD players, and optical drive devices. Magnetic flux for the actuator carriage assembly is typically generated by a magnetic circuit comprising a return path assembly, a pair of magnets, and a voice coil.

Typically, a single-loop flex circuit is attached to the actuator carriage assembly to (1) supply current to the voice coil and (2) carry signals between the heads and an electric circuit board. One drawback of a single-loop flex circuit is that it is unnecessarily wide because it carries both the current supplied to the coil and the signals to and from the read/write heads on the same loop. Thus, it is desirable to provide a flex circuit for an actuator carriage assembly that does not require as much space as a single-loop flex circuit.

A common problem with carriage assemblies utilizing single-loop flex circuits is that the signals carried to and from the read/write heads are subject to electrical or induced noise from the line of current supplied to the coil. The relatively large amount of current supplied to the voice coil creates a magnetic field around the wire carrying the current, resulting in induced noise that interferes with the relatively small electrical signals to and from the read/write heads. Because the current supplied to the coil and the signals to and from the heads are adjacent to each other in a single loop flex circuit, induced noise is a substantial problem. Thus, it is desirable to provide a flex circuit for an actuator carriage assembly that minimizes the induced noise that the line of current supplied to the coil imparts on the signals to and from the read/write heads.

A co-pending application having Ser. No. 08/728,128, entitled, "Actuator For Data Storage Device," hereby incorporated herein by reference in its entirety, describes an actuator carriage assembly having a central guide track (or center rod) on which bushings within the actuator carriage assembly ride. Each of the bushings, actuator carriage assembly arm assemblies, and coil are spaced substantially symmetrically about the center rod. Such symmetrical spacing is an advantage because it aligns the carriage center of mass and center of force along the center rod. Such alignment minimizes friction and avoids binding forces and resonance problems.

Although the center rod linearly directs the actuator carriage assembly, the actuator carriage assembly remains unrestrained from rotating axially around the center rod. Such rotation causes the carriage to roll about the center axis, i.e., the axis through which the center rod is centered. This roll of the carriage, in turn, adversely affects the accurate pitch of the read/write heads, i.e., from the perspective of the heads as they face 90° from the axis of the center rod to the rotating storage media as it rotates toward the heads. This roll of the carriage can also cause the voice coil to make contact with the cover of the actuator carriage assembly which is located directly above the voice coil at a very close distance, typically 0.25 mm or less.

A drawback of a single-loop flex circuit is that it gives the actuator carriage assembly a tendency to roll. The attachment of a flex circuit to the side of the actuator carriage assembly imparts a force on the assembly, tending to bind the assembly as the carriage moves along the center rod. As the carriage moves back and forth, the flexibility of the flex circuit imparts a moment force on the actuator carriage assembly that gives the assembly a tendency to roll about the center axis. Thus, it is desirable to provide a flex circuit for an actuator carriage assembly that does not result in affecting the roll of the actuator carriage assembly.

SUMMARY OF THE INVENTION

A flex circuit for conducting signals between heads of an actuator carriage assembly and an electrical circuit board and for supplying power to a voice coil is provided. The flex circuit has a first loop and a second loop. The first loop of this dual loop flex circuit has a U-shaped configuration and is mounted in part on a shroud, thereby effecting electrical contact with the electrical circuit board. The other part of the first loop is mounted on a first side of the actuator carriage assembly.

The second loop has a U-shaped configuration and is mounted in part on a shroud, thereby effecting electrical contact with the electrical circuit board. The other part of the second loop is mounted on a second side of the actuator carriage assembly such that forces exerted on said actuator carriage assembly by the first loop are canceled by forces exerted on the actuator carriage assembly by the second loop. The shroud serves to anchor the first loop and said second loop.

In the preferred embodiment of the present invention, the first loop of the dual loop flex circuit conducts the signals between the heads and the electrical circuit board and the second loop of the flex circuit supplies power to the coil. In another embodiment of the present invention, the first loop of the dual loop flex circuit further supplies power to an amplifier chip on the actuator carriage assembly. The amplifier chip is provided for amplifying the signals from the heads to the electric circuit board at a location prior to reaching the electrical circuit board.

DETAILED DESCRIPTION OF THE PREFERRED EMBODIMENTS

Figure 1:
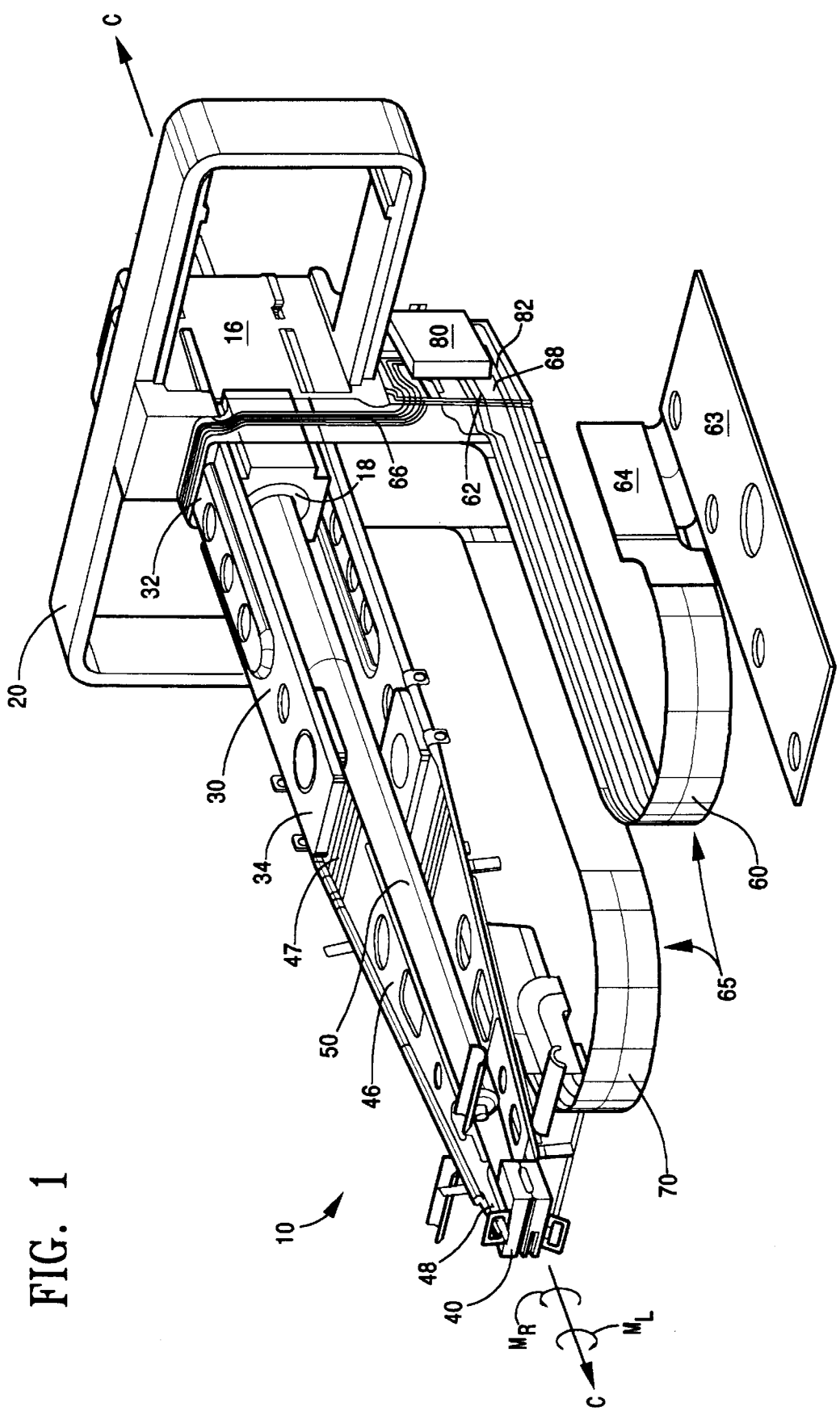
FIG. 1 is a perspective view of a first side of an actuator carriage assembly in cooperation with the preferred embodiment of the dual loop flex circuit.

Referring to the drawings, wherein like numerals indicate like elements, there is shown in FIG. 1 a perspective view of a first side of an actuator carriage assembly 10 in cooperation with the preferred embodiment of the dual loop flex circuit 65. The actuator carriage assembly 10 comprises a carriage 16 having a front bearing 18, a voice coil 20, arms 30 having a proximal end 32 and a distal end 34, load beams 46 having a proximal end 47 and a distal end 48, read/write heads 40, a center rod 50 having a center axis C–C', and an amplifier chip 80.

The voice coil 20 surrounds the carriage 16. The proximal end 32 of the arm 30 is attached to the carriage 16, the proximal end 47 of the load beams 46 are attached to the distal end 34 of the arms 30, and the read/write heads 40 are attached to the distal end 48 of the load beams 46. The carriage 16, the voice coil 20, the arms 30, and the load beams 46 are all centered around and move along the center rod 50 having a center axis C–C'. The carriage 16 surrounds the center rod 50 and rides on bushings in the central bore 18 of the carriage 16.

The preferred embodiment of the dual loop flex circuit 65 comprises a first (left) flex circuit loop 60 and a second (right) flex circuit loop 70, each connected to their respective sides of the carriage 16 (the terms "left" and "right" are used throughout this specification for illustrative purposes only and are not meant to limit the scope of the claimed invention in any way). As shown in FIG. 1, the left flex circuit loop 60 is connected to the left side of the carriage 16 proximate the amplifier chip 80 and comprises a left solder pad 68, a left connecting tab 64, signal on traces 62 going to and from the read/write heads 40 and power lines 82 for the amplifier chip 80.

The relatively small amplitude signals carried by traces 66 from the read/write heads 40 are amplified at the amplifier chip 80. The amplified signals carried by traces 62 travel from the left solder pad 68, along the left flex circuit loop 60 to the left contact pad 63 attached to a shroud (not shown). Preferably, the shroud is made of plastic or some other non-conductive material. The traces 62 on the left contact pad then make electrical contact with pressure connectors on the electronic circuit board (not shown). The left flex circuit loop 60 is connected to the left contact pad 63 by means of the left connecting tab 64. The signals on traces 62 traveling to the read/write heads 40 do not pass through the amplifier chip 80. Additional features of the actuator carriage assembly 10 are described in commonly assigned application having Ser. No. 08/872,712, entitled "Interlocking Carriage Assembly for Linear Actuator," (Attorney Docket No. IOM-9511), which is hereby incorporated herein by reference in its entirety.

Figure 2:
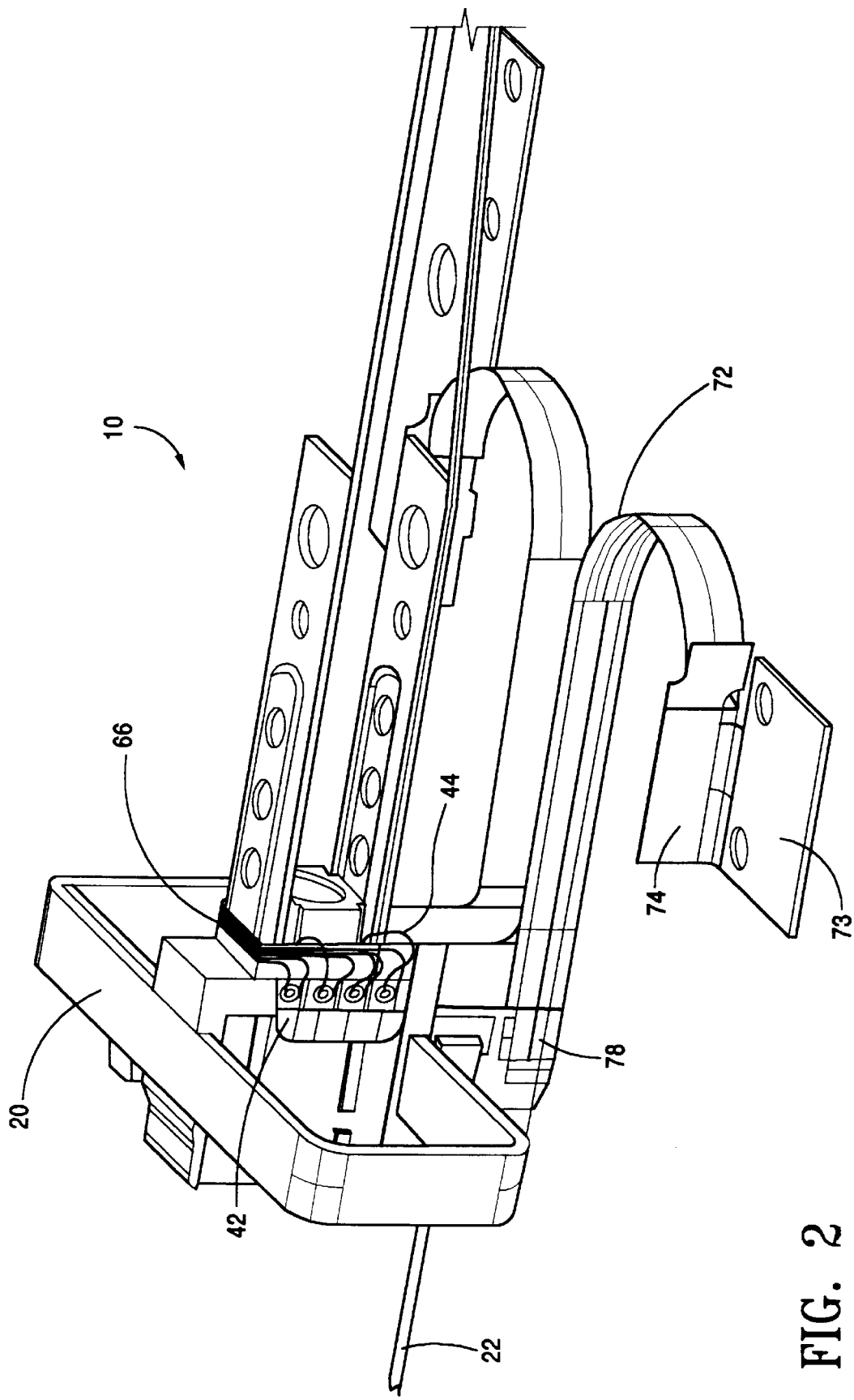
FIG. 2 is a perspective view of the second side of an actuator carriage assembly in cooperation with a preferred embodiment of the dual loop flex circuit.

Shown in FIG. 2 is a perspective view of the right side of an actuator carriage assembly 10 in cooperation with the preferred embodiment of the dual loop flex circuit. FIG. 2 shows the right flex circuit loop 70, voice coil leads 22, and head solder pads 42 from the left flex circuit loop 60 for the signals on traces 44 to and from the read/write heads 40. The right flex circuit loop 60 connected to the right side of the carriage 16 comprises a right solder pad 78, a right connecting tab 74, a right contact pad 73, and power lines 72 for the voice coil 20.

For illustrative purposes only, the voice coil leads 22 are shown projecting backward from the voice coil 20, but when properly situated, are folded and soldered to the right solder pads 78 of the right flex circuit loop 70 on the right side of the carriage 16. As with the left flex circuit loop 60, the right flex circuit loop 70 is connected to the right contact pad 73 by means of the right connecting tab 74. The right contact pad 73 is attached to the same shroud (not shown) as is the left contact pad 63. The power lines 72 on the right contact pad 73 then make electrical contact with pressure connectors on the same electronic circuit board (not shown) to which the left contact pad 63 makes contact.

Figure 3:
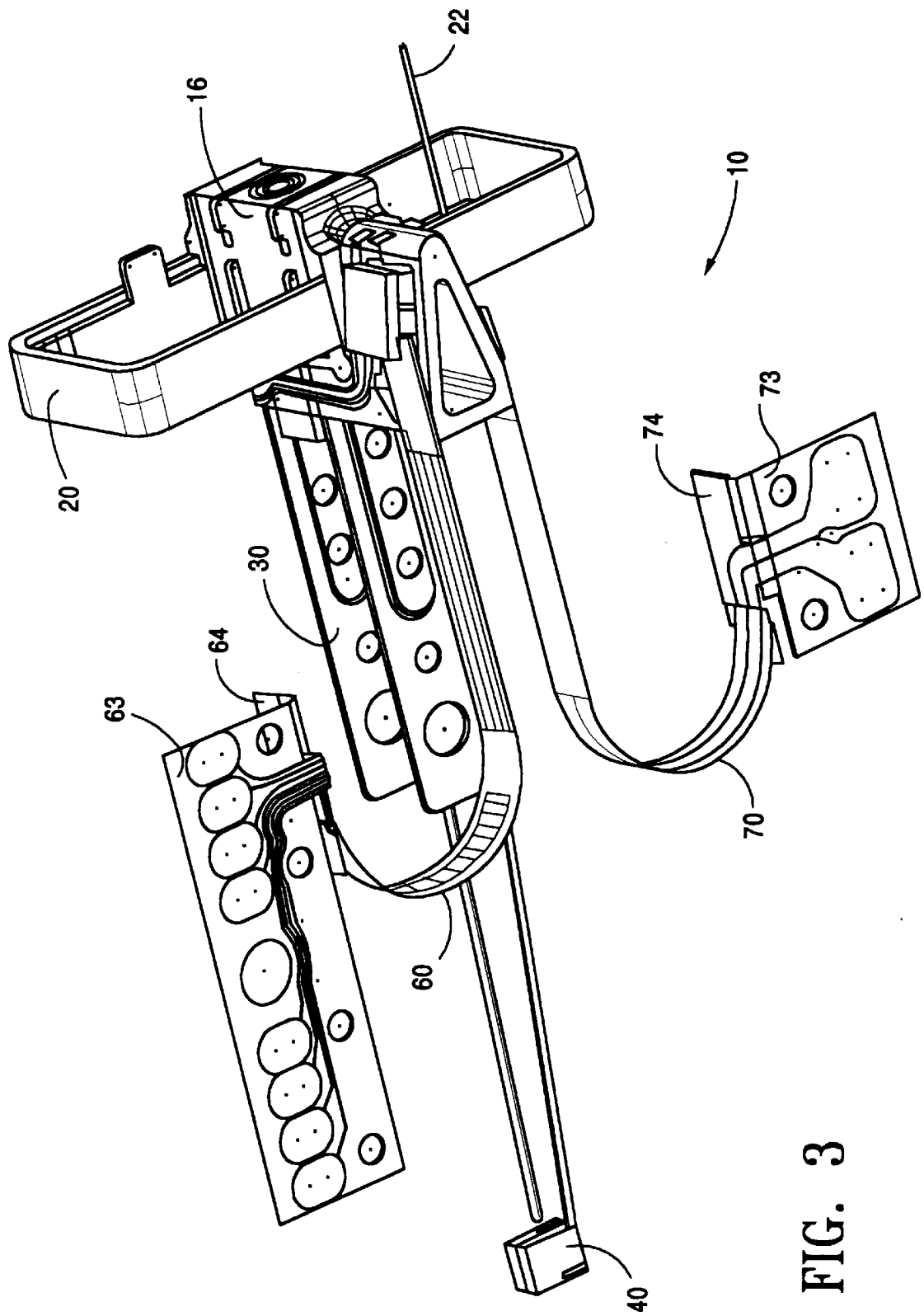
FIG. 3 is a perspective view of the underside of an actuator carriage assembly in cooperation with a preferred embodiment of the dual loop flex circuit.

Shown in FIG. 3 is a perspective view of the underside of the actuator carriage assembly 10 in cooperation with the preferred embodiment of the dual loop flex circuit 65. FIG. 3 shows the right contact pad 73 and the left contact pad 63 in more detail than shown in the previous figures. Although these contact pads 73 and 63 can be connected to the circuit board in several ways, these contact pads 73 and 63 are mounted on the same shroud (not shown) by means of a pressure sensitive adhesive that effects a bond when pressure is applied.

Figure 4:
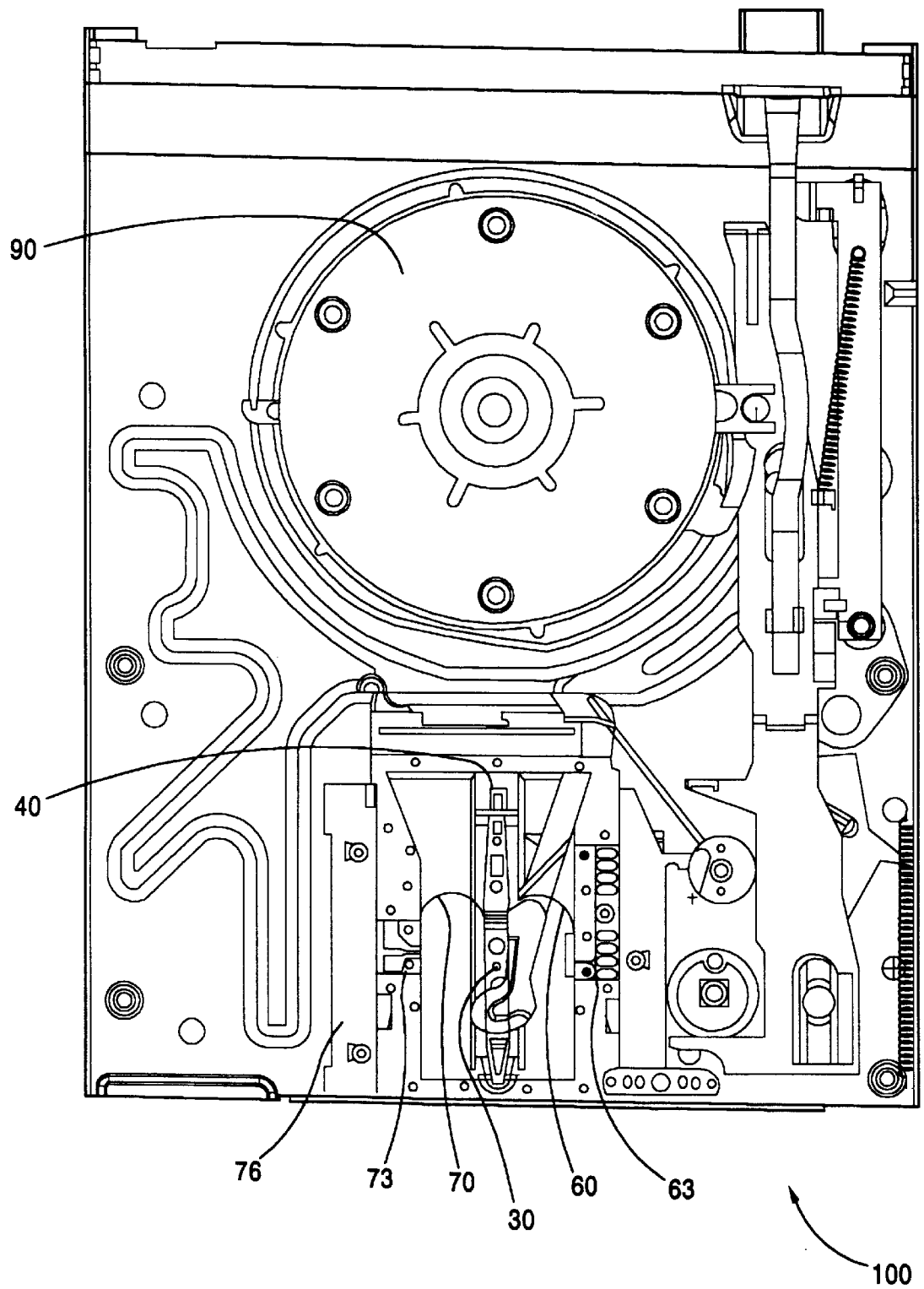
FIG. 4 is the underside view of an exemplary disk drive in cooperation with the preferred embodiment of the dual loop flex circuit 65.

Shown in FIG. 4 is the underside view of an exemplary disk drive 100 in cooperation with the dual loop flex circuit 65 of the present invention. A storage media is located on the spindle motor 90, where it is engaged by the read/write heads 40. Also shown in FIG. 4 is the shroud 76 to which the left contact pad 63 and the right contact pad 73 are mounted. The shroud 73 serves as an anchor for the dual loop flex circuit 65. Additional features of this disk drive 100 are described in commonly assigned applications: Ser. No. 08/866,189, filed on May 30, 1997, entitled "An Improved Operating System For Operating An Eject System And A Head Retraction System Of A Disk Drive" (Attorney Docket No. IOM-9460); Ser. No. 08/866,225, filed on May 30, 1997, entitled "An Improved Head Retraction System for Retracting The Heads Of A Disk Drive" (Attorney Docket No. IOM-9464); Ser. No. 08/866,177, filed on May 30, 1997, entitled "Motor Loading System For A Disk Drive" (Attorney Docket No. IOM-9526); and Ser. No. 08/866,226, filed on May 30, 1997, entitled "An Improved Eject System For Ejecting A Disk Cartridge From A Disk Drive" (Attorney Docket No. IOM-9527).

Figure 5:
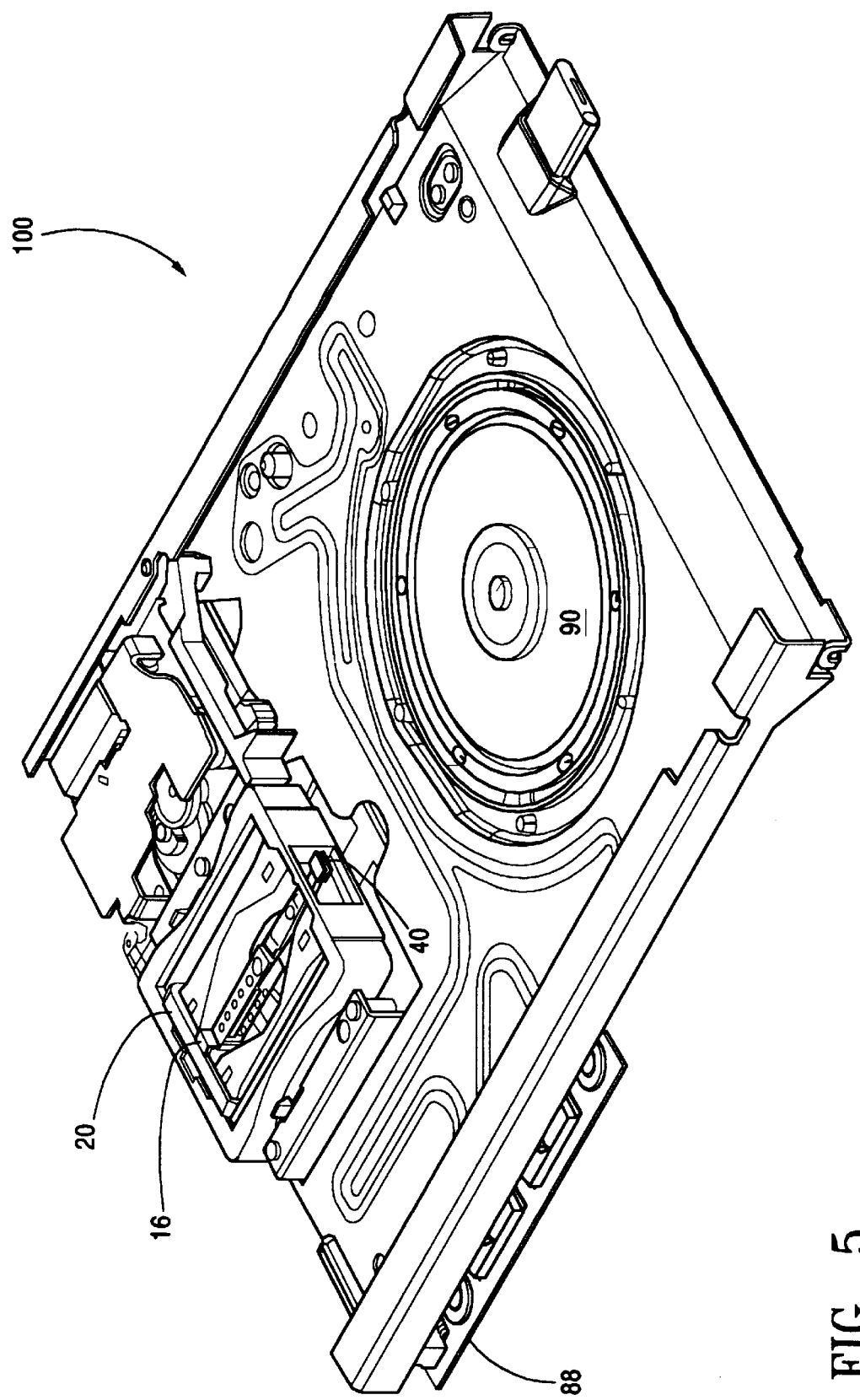
FIG. 5 is a perspective view of an exemplary disk drive 100 in cooperation with the dual loop flex circuit 65.

Shown in FIG. 5 is perspective view of an exemplary disk drive 100 in cooperation with the dual loop flex circuit 65 of the present invention. In FIG. 5, a portion of the electronic circuit board 88 to which the left contact pad 63 and the right contact pad 73 of the dual loop flex circuit 65 are connected, is shown.

The advantages of the dual loop flex circuit 65 of the present invention are several, each addressing prominent problems attendant to single loop flex circuits. Referring to FIG. 1, a major problem with the single loop flex circuit can be seen. The attachment of left flex circuit loop 60 on the left side of the carriage 16 imparts a force on the actuator carriage assembly 10, tending to bind the actuator carriage assembly 10 as the arm 30 moves along the center rod 50. As the arm 30 moves back and forth, the flexibility of the left flex circuit loop 60 imparts a moment force $M_L$ on the actuator carriage assembly 10 that gives the assembly a tendency to roll about the center axis C–C' in a clockwise direction as shown in FIG. 1.

The benefit of the dual loop design is that the right flex circuit loop 70 imparts an equal and opposite moment force $M_R$ on the actuator carriage assembly 10, giving the assembly 10 a tendency to roll about the center axis C–C' in the counter-clockwise direction. Thus, the dual loop flex circuit 65 of the present invention does not affect the roll of the actuator carriage assembly 10 as does a single loop flex circuit. The orientation of the two loops 60 and 70 and the resulting balancing of the forces exerted on the actuator carriage assembly 10 by the two loops 60 and 70 is best illustrated in FIG. 3.

Another advantage of the dual loop flex circuit 65 is the separation of the lines of current 72 to the voice coil 20 from the signals on traces 62 to and from the read/write heads 40. Because the current on the power lines 72 to the voice coil 20 travels on the right flex circuit loop 70 and the signals on traces 62 to and from the read/write heads 40 travel on the left flex circuit loop 70, the induced noise from the current on lines 72 supplied to the coil 20 that interferes with the signals on traces 62 to and from the read/write heads 40 is minimized.

Another advantage of the dual loop flex circuit 65 is that it is not as wide as a single loop flex circuit. A single loop flex circuit that carries both the current on lines 72 supplied to the coil 20 and the signals on traces 62 to and from the read/write heads 40 on the same loop is approximately 3.0 mm wide. Each side of the dual loop flex circuit, however, is only about 1.5 mm wide. This reduction in the width of approximately 1.5 mm is significant considering the height restrictions on the version of a ZIP™ drive suitable for laptop and notebook computers are in the range of 12 to 15 mm. Thus, the dual loop flex circuit 65 of the present invention does not require as much vertical space as a single-loop flex circuit.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

We claim:

1. An actuator carriage assembly for carrying read/write heads into engagement with a storage medium comprising:

a carriage having a first side, a second side and a center axis, said heads being mounted on said carriage;

a magnetic motor for driving said carriage and heads into and out of engagement with said medium, said magnetic motor including a coil mounted on said carriage;

an electrical circuit board for supplying electrical signals to said heads and for receiving electrical signals from said heads; and a flex circuit for conducting signals between said heads and said electrical circuit board and for supplying power to said coil, said flex circuit having a first loop and a second loop, said first loop having a U-shaped configuration and mounted in part on a shroud and making electrical contact with said electrical circuit board and mounted in part on said first side of said carriage, said second loop having a U-shaped configuration and mounted in part on said shroud and making electrical contact with said electrical circuit board and mounted in part on said second side of said carriage such that forces exerted on said carriage by said first loop are canceled by forces exerted on said carriage by said second loop, wherein said shroud serves to anchor said first loop and said second loop, and said first loop and second loop are in constant symmetry with respect to a center axis of said actuator carriage assembly.

2. The apparatus of claim 1, wherein said first loop of said flex circuit conducts said signals between said heads and said electrical circuit board and said second loop of said flex circuit supplies power to said coil.

3. The apparatus of claim 2 further comprising an amplifier chip for amplifying said signals from said heads to said electric circuit board at a location prior to reaching said electrical circuit board, wherein said first loop of said flex circuit further supplies power to said amplifier chip on said actuator carriage assembly.

4. A flex circuit for conducting signals between heads of an actuator carriage assembly and an electrical circuit board and for supplying power to a voice coil, said flex circuit having a first loop and a second loop, said first loop having a U-shaped configuration and mounted in part on a shroud and making electrical contact with said electrical circuit board and mounted in part on a first side of said actuator carriage assembly, said second loop having a U-shaped configuration and mounted in part on said shroud and making electrical contact with said electrical circuit board and mounted in part on a second side of said actuator carriage assembly such that forces exerted on said actuator carriage assembly by said first loop are canceled by forces exerted on said actuator carriage assembly by said second loop, wherein said shroud serves to anchor said first loop and said second loop, and said first loop and second loop are in constant symmetry with respect to a center axis of said actuator carriage assembly.

5. The apparatus of claim 4, wherein said first loop of said flex circuit conducts said signals between said heads and said electrical circuit board and said second loop of said flex circuit supplies power to said coil.

6. The apparatus of claim 5 further comprising an amplifier chip for amplifying said signals from said heads to said electric circuit board at a location prior to reaching said electrical circuit board, wherein said first loop of said flex circuit further supplies power to said amplifier chip on said actuator carriage assembly.

* * * * *